United States Patent
Yang et al.

(10) Patent No.: US 7,310,251 B2
(45) Date of Patent: Dec. 18, 2007

(54) CONTROL CIRCUIT HAVING TWO-LEVEL UNDER VOLTAGE LOCKOUT THRESHOLD TO IMPROVE THE PROTECTION OF POWER SUPPLY

(75) Inventors: Ta-yung Yang, Milpitas, CA (US); Wei-Hsuan Huang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 105 days.

(21) Appl. No.: 11/360,445

(22) Filed: Feb. 24, 2006

(65) Prior Publication Data
US 2007/0201252 A1   Aug. 30, 2007

(51) Int. Cl.
*H02H 7/122* (2006.01)
*H02M 3/335* (2006.01)
*G05F 1/40* (2006.01)

(52) U.S. Cl. ............................ 363/56.09; 363/21.12; 363/56.01

(58) Field of Classification Search .......... 363/16, 363/20, 21.01, 21.12, 12.13, 21.15, 21.17, 363/56.01, 56.09, 56.1, 56.11, 95, 97, 131; 361/18, 86, 90, 91.1, 92
See application file for complete search history.

(56) References Cited

U.S. PATENT DOCUMENTS

| | | | | |
|---|---|---|---|---|
| 4,210,947 A | * | 7/1980 | Koizumi | .................. 361/18 |
| 5,784,231 A | * | 7/1998 | Majid et al. | .............. 363/56.11 |
| 6,807,075 B2 | * | 10/2004 | Miermans | .................... 363/49 |
| 6,922,345 B2 | * | 7/2005 | Nishida et al. | .......... 363/21.16 |
| 6,980,443 B2 | * | 12/2005 | Nagano et al. | .......... 363/21.12 |

* cited by examiner

*Primary Examiner*—Matthew V. Nguyen
(74) *Attorney, Agent, or Firm*—Rosenberg, Klein & Lee

(57) ABSTRACT

The invention presents a switching power control circuit including two levels of under voltage lockout to improve the protection of the power supply. An input terminal of control circuit is connected to a supplied capacitor to supply the power of the control circuit. The supplied capacitor is charged through a start resistor for the start-up. Once the input voltage reaches a start-up voltage, the control circuit will start the operation. After that, the power is further supplied from a transformer of the power supply. If a fault condition is occurred, the switching of the control circuit will be stop and the supplied capacitor will be discharged. When the input voltage is discharged lower than a first under-voltage lockout threshold, the circuits of control circuit are shut down to consume lower power. Furthermore, once the input voltage is discharged lower than a second under-voltage lockout threshold, the control circuit will enable the start-up again. During the discharge period from the first under-voltage lockout threshold to second under-voltage lockout threshold, the switching of the control circuit is off and the discharge time is increased which reduces of the switching duty cycle and improves the protection of the power supply.

13 Claims, 3 Drawing Sheets

CONTROL CIRCUIT HAVING TWO-LEVEL UNDER VOLTAGE LOCKOUT THRESHOLD TO IMPROVE THE PROTECTION OF POWER SUPPLY

FIELD OF THE INVENTION

The present invention relates to power supply and more specifically relates to the protection circuit of power supply.

BACKGROUND OF THE INVENTION

Power supplies are used to provide regulated output from an unregulated power source. For the sake of safety reasons, a protection circuit must be provided to protect the power supply itself and the system it power. A limited power output is strictly required for a power supply during fault conditions such as overload, short circuit and feedback open loop. The object of the present invention is to provide a control circuit to reduce the output power during the power supply protection.

SUMMARY OF THE INVENTION

The invention provides a control circuit including two levels of under voltage lockout threshold to improve the protection of the power supply. The control circuit includes a switching circuit, a protection circuit and a detection circuit. The switching circuit is coupled to an output terminal of the power supply to generate a switching signal for regulating the output of the power supply. The protection circuit is developed to disable the switching signal in response to the fault condition. The detection circuit will generate a start signal and an on/off signal to turn on/off the circuits of the control circuit in accordance with the input voltage of the control circuit. The detection circuit includes a first under-voltage lockout threshold and a second under-voltage lockout threshold.

An input terminal of the control circuit is connected to a supplied capacitor to supply the power to the control circuit. The supplied capacitor is charged through a start resistor for the start-up. Once the input voltage reaches a start-up voltage, the detection circuit will generate the start signal and the on/off signal to start the switching signal. After that, the supplied capacitor is charged by a transformer of the power supply. If a fault condition is occurred, the protection circuit will disable the switching signal, and the supplied capacitor will therefore start to discharge. When the input voltage is discharged lower than the first under-voltage lockout threshold, the circuits of the control circuit are shut down by the detection circuit to consume lower power and increase the discharge time of the supplied capacitor. Furthermore, once the input voltage is discharged lower than the second under-voltage lockout threshold, the control circuit will enable the start- up again by the detection circuit. During the discharge period from the first under-voltage lockout threshold to the second under-voltage lockout threshold, the switching of the control circuit is off and the discharge time is increased which reduces of the switching duty cycle and improves the protection of the power supply.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
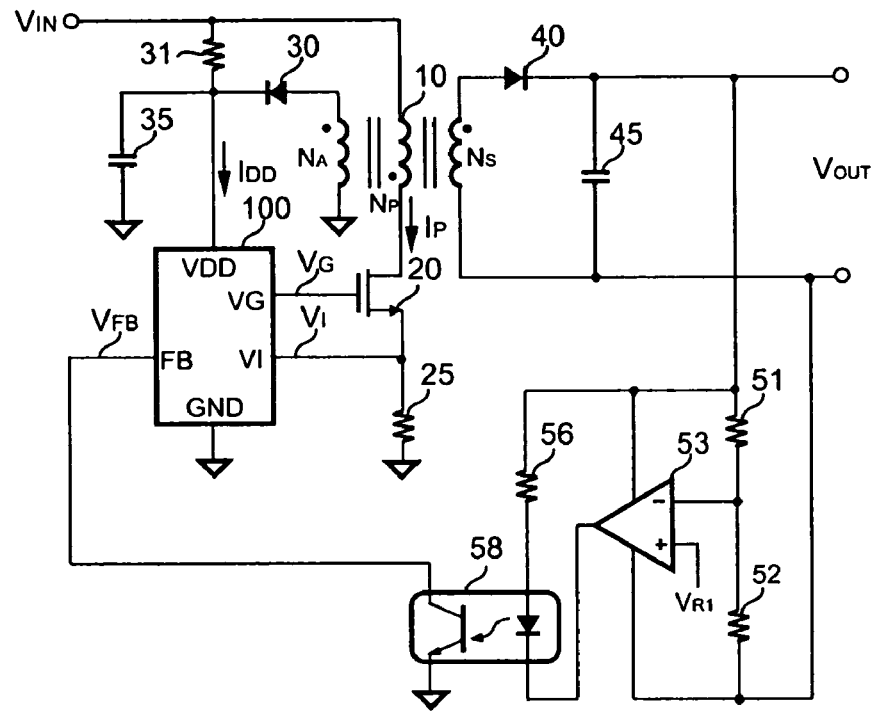
FIG. 1 shows a circuit diagram of a power supply according to a preferred embodiment of the present invention.

FIG. 1 shows a schematic of a power supply. A transformer 10 includes a primary winding $N_P$, a secondary winding $N_S$ and an auxiliary winding $N_A$. A terminal of the primary winding $N_P$ is coupled to an unregulated voltage $V_{IN}$. A transistor 20 is connected from another terminal of the primary winding $N_P$ to a ground through a current sense resistor 25. The current sense resistor 25 is used to convert a switching current $I_P$ of the transformer 10 to a sense voltage $V_I$. A start resistor 31 is connected from the unregulated voltage $V_{IN}$ to charge a supplied capacitor 35. The supplied capacitor 35 is further connected to an input terminal VDD of a control circuit 100 for supplying the power to the control circuit 100. Once the input voltage $V_{DD}$ is charged up to a start up voltage of the control circuit 100, the control circuit 100 will start to operate.

A ground terminal GND of the control circuit 100 is coupled to the ground. A current sense terminal VI of the control circuit 100 receives the sense voltage $V_I$ represents the switching current $I_P$ of the transformer 10. A feedback terminal FB of the control circuit 100 is coupled to an output terminal of the power supply through an optical-coupler 58 and an error amplifier 53 to detect the output voltage $V_{OUT}$ and generate a feedback signal $V_{FB}$ at the feedback terminal FB. In accordance with the feedback signal $V_{FB}$ and the sense voltage $V_I$, a switching signal $V_G$ is generated by a output terminal VG of the control circuit 100 to drive the transistor 20 for switching the transformer 10 and regulating the output voltage $V_{OUT}$ of the power supply. After the switching of transformer 10, the power of the control circuit 100 is further supplied from the auxiliary winding $N_A$ of the transformer 10 via a diode 30. If a fault condition is occurred, the switching of the transformer 10 will be stop and the supplied capacitor 35 will be discharged.

A rectifier 40 is coupled between a terminal of the secondary winding $N_S$ and the output terminal of the power supply. A filter capacitor 45 is coupled to the rectifier 40 and another terminal of the secondary winding $N_S$. A resistor 51 and a resistor 52 coupled in series with the output terminal of the power supply. The negative input of the error amplifier 53 is coupled to a joint of the resistor 51 and 52. The positive input of the error amplifier 53 is connected to a reference voltage $V_{R1}$. A resistor 56 is coupled to the output terminal of the power supply, the resistor 51 and the optical-coupler 58. The optical-coupler 58 further coupled to the output of the error amplifier 53 and the feedback terminal FB.

Figure 2:
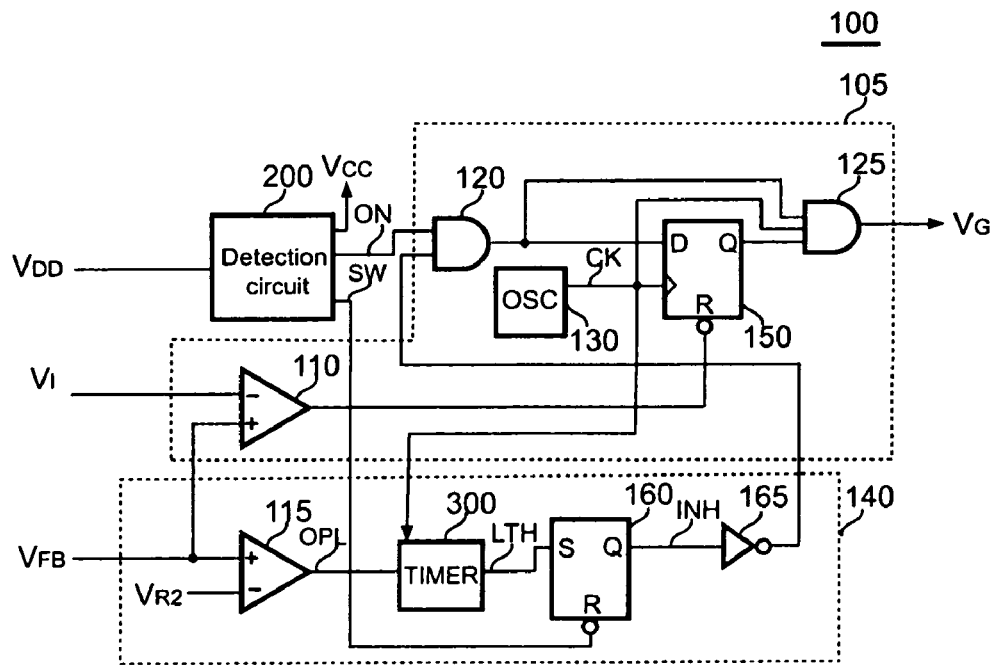
FIG. 2 shows a circuit diagram of a control circuit of the power supply according to a preferred embodiment of the present invention.

FIG. 2 shows the control circuit 100 comprises a switching circuit 105, a protection circuit 140 and a detection circuit 200. The detection circuit 200 is applied to generate a start signal SW and an on/off signal ON to turn on/off the circuits of the control circuit 100 in accordance with the input voltage $V_{DD}$. The detection circuit 200 more generates a supply voltage $V_{CC}$ for supplying power to the circuits of the control circuit 100. The switching circuit 105 is coupled to the output terminal of the power supply through the feedback terminal FB to generate the switching signal $V_G$. The switching signal $V_G$ is utilized to regulate the output voltage $V_{OUT}$ of the power supply. The switching circuit 105 includes a first comparator 110, an oscillator 130, a flip-flop 150 and a first AND gate 120 and a second AND gate 125. The protection circuit 140 is utilized to disable the switching signal $V_G$ in response to the fault conditions. The protection circuit 140 includes a second comparator 115, a timer 300, a latch 160 and a first inverter 165. The second comparator 115 includes a reference voltage $V_{R2}$ coupled to the negative input of the second comparator 115.

The positive input of the second comparator 115 is connected to the feedback terminal FB to receive the feedback signal $V_{FB}$. Once the feedback is open loop in the fault conditions, the second comparator 115 will produce an open-loop signal OPL to count the period of the fault conditions in the timer 300. The timer 300 transmits a latch signal LTH to the set input of the latch 160 when the timer 300 is expired. The reset input of the latch 160 is coupled to the detection circuit 200 to receive the start signal SW. Once the timer 300 is expired, the output of the latch 160 will generate an inhibit signal INH to turn off the switching signal $V_G$ according to the latch signal LTH. Through the first inverter 165, the inhibit signal INH is transmitted to the input of the first AND gate 120. Another input of the first AND gate 120 is connected to the detection circuit 200 to receive the on/off signal ON. The output of the first AND gate 120 is connected to the input of the flip-flop 150.

The flip-flop 150 is enabled by a clock signal CK generated by the oscillator 130. The reset input of the flip-flop 150 is connected to the output of the first comparator 110. The negative input of the first comparator 110 is connected to the current sense terminal VI to receive the sense voltage $V_I$. The positive input of the first comparator 110 is coupled to feedback terminal FB to receive the feedback signal $V_{FB}$ for regulating the output of the power supply. The output of the flip-flop 150 is connected to the first input of the second AND gate 125. The second input and the third input of the second AND gate 125 are respectively connected to the oscillator 130 and the output of the first AND gate 120.

Figure 3:
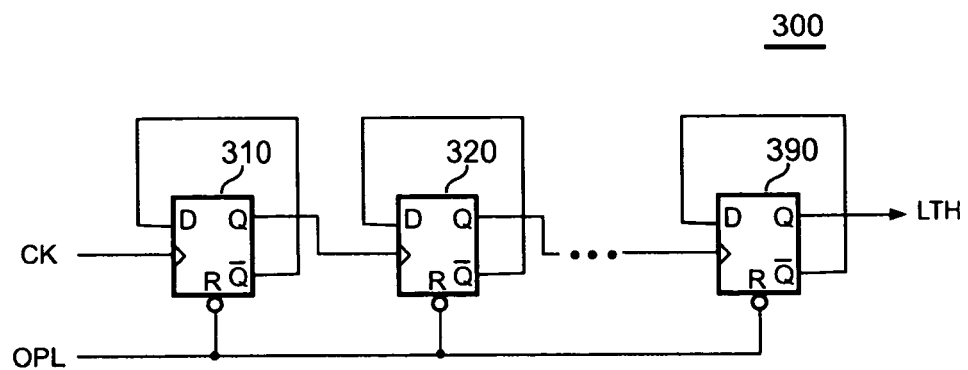
FIG. 3 shows a circuit diagram of a timer of the control circuit according a preferred embodiment of the present invention.

FIG. 3 shows a circuit diagram of the timer 300. The timer 300 comprises a plurality of flip-flops 310,320,330,340,350, 360,370,380 and 390. The flip-flops 310~390 are coupled in series with each other. The flip-flop 310 is enabled by the clock signal CK. The output Q of flip-flop 310 is coupled to the flip-flop 320 to enable the flip-flop 320. The same above, the outputs Q of the flip-flops 320~380 are coupled to the flip-flops 330~390 to enable the flip-flops 330~390 respectively. The output Q of the flip-flop 390 generates the latch signal LTH. The outputs $\overline{Q}$ of the flip-flops 310~390 are coupled to the inputs D of the flip-flops 310~390 respectively. The open-loop signal OPL produced by the output of the second comparator 115 is transmitted to each reset input R of the flip-flops 310~390.

Figure 4:
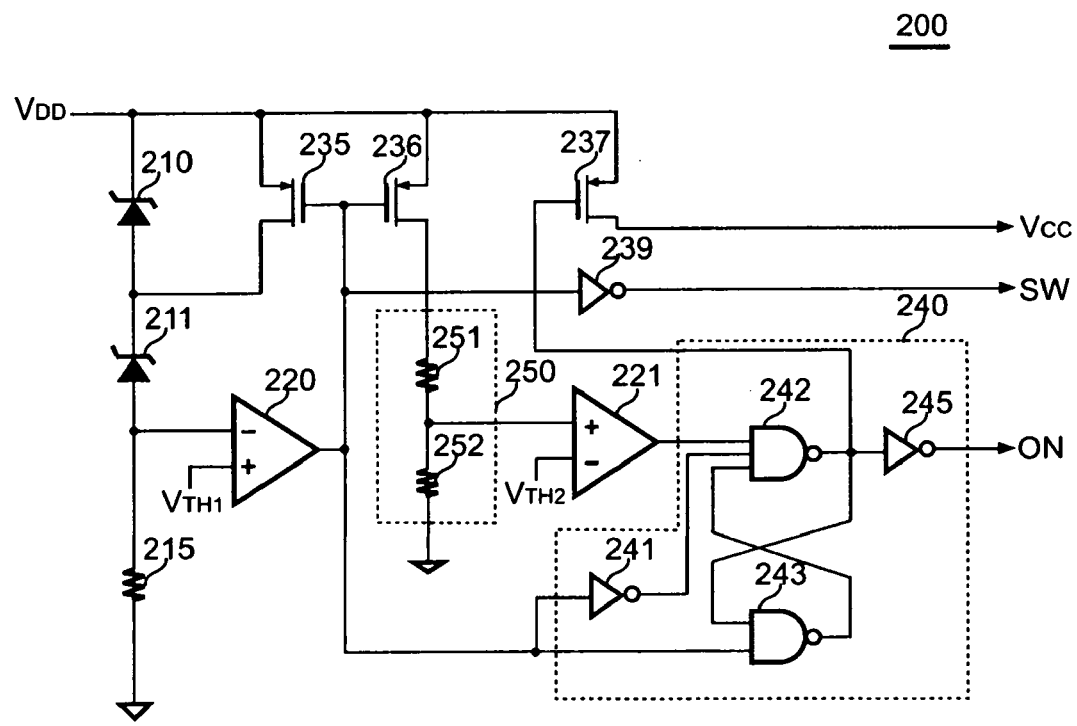
FIG. 4 shows a circuit diagram of a detection circuit of the control circuit according a preferred embodiment of the present invention.

FIG. 4 shows a preferred embodiment of a detection circuit 200 according to the present invention. A first device 210 and a second device 211 provide a reference voltage in response the input voltage $V_{DD}$. The first device 210 and the second device 211 can be zener diodes. The first device 210 receives the input voltage $V_{DD}$. The second device 211 is connected in series with the first device 210. A resistor 215 is connected in series to the first device 210 and the second device 211 for the voltage detection. A third comparator 220 having a first threshold voltage $V_{TH1}$ is coupled to the resistor 215 to generate the start signal SW in response to the input voltage $V_{DD}$. The positive input of the third comparator 220 receives the first threshold voltage $V_{TH1}$. The negative input of the third comparator 220 is coupled to the resistor 215. The output of the third comparator 220 is connected to the input of a second inverter 239. The start signal SW is produced at the output of the second inverter 239.

A first switch 235 is coupled to the input terminal VDD to receive the input voltage $V_{DD}$. The first switch 235 further is coupled to the first device 210 to short circuit the first device 210 and to reduce the reference voltage in response to the output signal of the third comparator 220. The output of the third comparator 220 further is coupled to a second switch 236 to control the second switch 236. The second switch 236 receives the input voltage $V_{DD}$. A fourth comparator 221 is coupled to the input terminal VDD of the control circuit 100 to detect the input voltage $V_{DD}$ via the second switch 236 and a voltage divider 250 having resistors 251, 252 once the enable of the start signal SW. The resistors 251, 252 connected in series with the second switch 236 and the ground. The fourth comparator 221 includes a second threshold voltage $V_{TH2}$. The negative input of the fourth comparator 221 receives the second threshold voltage $V_{TH2}$. The positive input of the fourth comparator 221 is coupled to a joint of the resistors 251, 252. The output of the fourth comparator 221 is connected to a latch circuit 240.

The latch circuit 240 includes NAND gates 242, 243 and inverters 241, 245. The output of the fourth comparator 221 is connected to the first input of the first NAND gate 242. The output of the third comparator 220 is connected to the second input of the first NAND gate 242 through the third inverter 241. The output of the third comparator 220 is further connected to the input of the second NAND gate 243. The output of the second NAND gate 243 is coupled to the third input of the first NAND gate 242. The output of the first NAND gate 242 is coupled to another input of the second NAND gate 243. The on/off signal ON is generated at the output of the fourth inverter 245 once the enable of the start signal SW. The input of the fourth inverter 245 is connected to the output of the first NAND gate 242. The output of the first NAND gate 242 further is coupled to a third switch 237 to control the third switch 237 receiving the input voltage $V_{DD}$ for turning on/off the power to the circuits of the control circuit 100.

Figure 5:
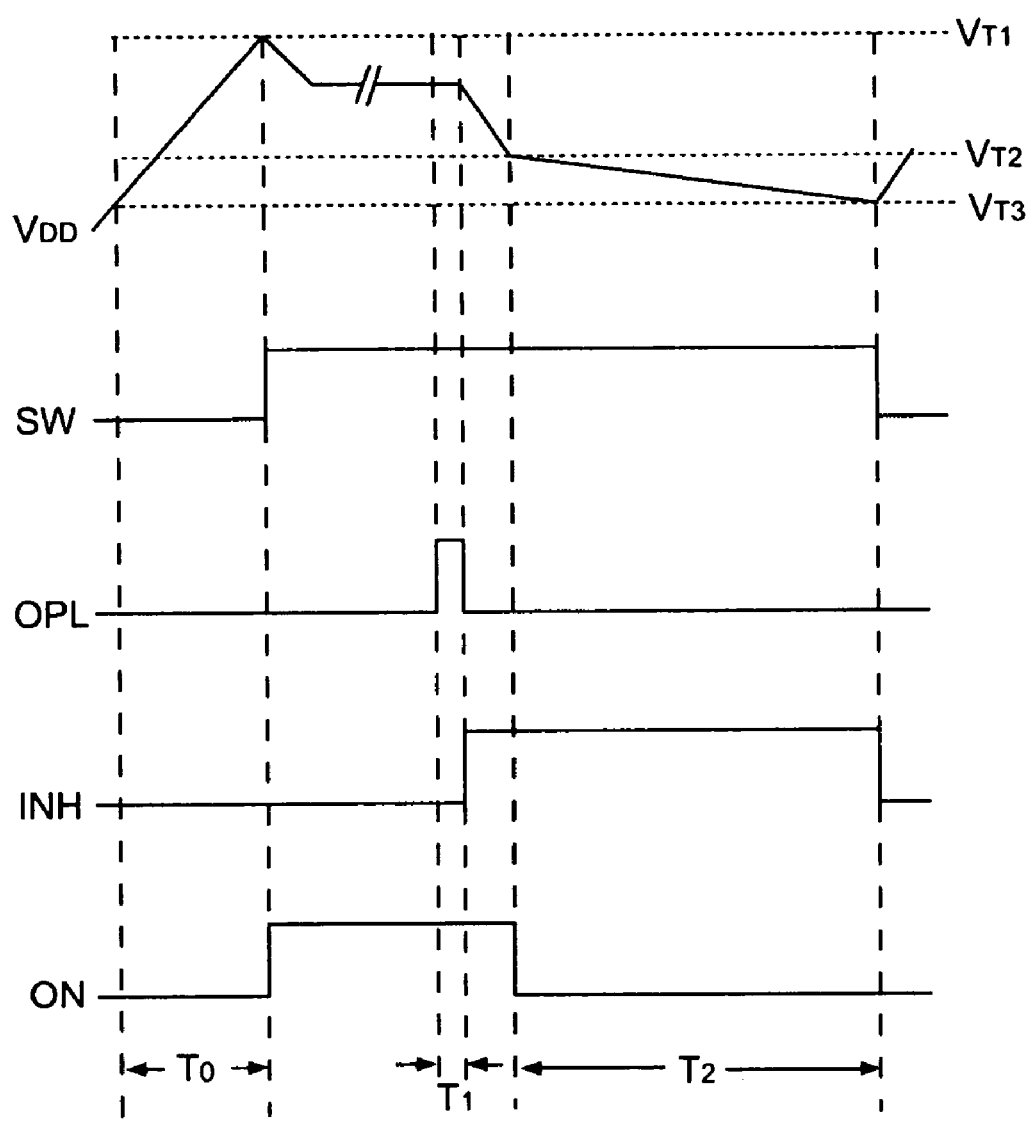
FIG. 5 shows signal waveforms according to a preferred embodiment of the present invention.

FIG. 5 shows signal waveforms according to a preferred embodiment of the present invention. A first threshold $V_{T1}$ is higher than a second threshold $V_{T2}$. The second threshold $V_{T2}$ is higher than a third threshold $V_{T3}$. The start signal SW and the on/off signal ON are enabled to turn on the circuits of the control circuit 100 once the input voltage $V_{DD}$ is higher than the first threshold $V_{T1}$ during the time $T_0$, in which the first threshold $V_{T1}$ is determined by the first threshold voltage $V_{TH1}$ and the reference voltage of the devices 210 and 211. Once the circuits of the control circuit 100 are turned on, the switching signal $V_G$ is generated to switching the transformer 10. After that, the power of the control circuit 100 is further supplied from the auxiliary winding $N_A$ of the transformer 10.

If a fault condition is occurred, the open-loop signal OPL is enabled during the time $T_1$. After that, the inhibit signal INH is able to disable the switching signal $V_G$. The transformer 10 will be stopped switching and the supplied capacitor 35 will be discharged to supply the input voltage $V_{DD}$ to the control circuit 100. The on/off signal ON is disabled to turn off the circuits of the control circuit 100 once the input voltage $V_{DD}$ is lower than the second threshold $V_{T2}$. The second threshold voltage $V_{TH2}$ and the ratio of resistors 251, 252 determine the second threshold $V_{T2}$. The control circuit 100 consumes a first operating current when the circuits of the control circuit 100 are turned on. The control circuit 100 consumes a second operating current once the circuits of the control circuit 100 are turned off.

When the input voltage $V_{DD}$ further is lower than the third threshold $V_{T3}$, the start signal SW will be disabled and the control circuit 100 will only consume a start-up current. Therefore, the control circuit 100 will be start-up again. Once the start signal SW is disabled, meanwhile the inhibit signal INH is disabled by the start signal SW through the latch 160. The first threshold voltage $V_{TH1}$ and the reference voltage determine the third threshold voltage $V_{T3}$. The first operating current is higher than the second operating current. The second operating current is higher than the start-up current. During the discharge period $T_2$ from the second threshold $V_{T2}$ (the first under-voltage lockout threshold) to the third threshold $V_{T3}$ (the second under-voltage lockout threshold), the switching of the control circuit 100 is off and the discharge time $T_2$ is increased which reduces of the switching duty cycle and improves the protection of the power supply.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power supply comprising:
   a switching circuit coupled to an output terminal of the power supply to generate a switching signal for regulating the output of the power supply, in which the switching signal is used to switch a transformer of the power supply;
   a protection circuit generating a inhibit signal transmitted to the switching circuit to disable the switching signal in response to the fault conditions; and
   a detection circuit having a first threshold, a second threshold and a third threshold to generate a start signal and an on/off signal transmitted to the protection circuit and the switching circuit to turn on/off the circuits of the control circuit in accordance with an input voltage of the control circuit, in which the first threshold is higher than the second threshold and the second threshold is higher than the third threshold, the start signal and the on/off signal are enabled to turn on the circuits of the control circuit once the input voltage is higher than the first threshold, the on/off signal is disabled to turn off the circuits of the control circuit once the input voltage is lower than the second threshold, the start signal is disabled when the input voltage is further lower than the third threshold;
   wherein the control circuit consumes a first operating current when the circuits of the control circuit are turned on, the control circuit consumes a second operating current once the circuits of the control circuit are turned off, the control circuit only consumes a start-up current when the start signal is disabled, in which the first operating current is higher than the second operating current and the second operating current is higher than the start-up current.

2. The control circuit as claimed in claim 1, wherein the protection circuit comprising:
   a timer counting the period of the fault conditions in accordance with a feedback signal of the power supply; and
   a latch coupled to the timer for generating the inhibit signal to disable the switching signal once the timer being expired, wherein the latch is disabled in accordance with the start signal.

3. The control circuit as claimed in claim 1, wherein the detection circuit comprising:
   a first device receiving the input voltage;
   a second device connected to the first device;
   a third comparator coupled to the second device and including a first threshold voltage to generate the start signal in response to the input voltage;
   a first switch coupled to the first device, the second device and the third comparator, in which the first switch receives the input voltage; and
   a fourth comparator coupled to an input terminal of the control circuit and including a second threshold voltage to detect the input voltage for generating the on/off signal once the enable of the start signal.

4. The control circuit as claimed in claim 3, wherein the detection circuit further comprises a latch circuit coupled to the output terminals of the fourth comparator and the third comparator to generating the on/off signal.

5. The control circuit as claimed in claim 3, wherein the first device and the second device provide a reference voltage, and the first switch is used to adjust the reference voltage in response to the output of the third comparator, in which the first threshold and the third threshold are determined by the first threshold voltage and the reference voltage.

6. The control circuit as claimed in claim 3, wherein the detection circuit further comprises a voltage divider coupled the input terminal of the control circuit and the fourth comparator, in which the second threshold is determined by the ratio of the voltage divider and the second threshold voltage.

7. A control circuit of a power supply comprising:
   a switching circuit coupled to an output terminal of the power supply to generate a switching signal for regulating the output of the power supply;
   a protection circuit generating a inhibit signal transmitted to the switching circuit to disable the switching signal in response to the fault conditions; and
   a detection circuit having a first threshold, a second threshold and a third threshold to generate a start signal and an on/off signal transmitted to the protecting circuit and the switching circuit in accordance with an input voltage of the control circuit, in which the start signal and the on/off signal are enabled to turn on the circuits of the control circuit and enable the switching signal once the input voltage is higher than the first threshold, the switching signal and the circuits of the control circuit are disable once the input voltage is lower than the second threshold;

wherein the control circuit consumes a first operating current when the circuits of the control circuit are turned on, the control circuit consumes a second operating current once the circuits of the control circuit are turned off, the control circuit consumes a start-up current when the input voltage is further lower than the third threshold.

8. The control circuit as claimed in claim 7, wherein the first threshold is higher than the second threshold, the second threshold is higher than the third threshold, in which the first operating current is higher than the second operating current, the second operating current is higher than the start-up current.

9. The control circuit as claimed in claim 7, wherein the protection circuit comprising:
   a timer counting the period of the fault conditions in accordance with a feedback signal of the power supply; and
   a latch coupled to the timer for generating the inhibit signal to disable the switching signal once the timer being expired, wherein the latch is disabled in accordance with the start signal.

10. The control circuit as claimed in claim 7, wherein the detection circuit comprising:
    a first device receiving the input voltage;
    a second device connected to the first device;
    a third comparator coupled to the second device and including a first threshold voltage for generating the start signal in response to the input voltage;
    a first switch coupled to the first device, the second device and the third comparator, in which the first switch receives the input voltage; and
    a fourth comparator coupled to an input terminal of the control circuit and including a second threshold voltage to detect the input voltage for generating the on/off signal once the enable of the start signal.

11. The control circuit as claimed in claim 10, wherein the detection circuit further comprises a latch circuit coupled to the output terminals of the fourth comparator and the third comparator to generating the on/off signal.

12. The control circuit as claimed in claim 10, wherein the first device and the second device provide a reference voltage, and the first switch is used to adjust the reference voltage in response to the output of the third comparator, in which the first threshold and the third threshold are determined by the first threshold voltage and the reference voltage.

13. The control circuit as claimed in claim 10, wherein the detection circuit further comprises a voltage divider coupled the input terminal of the control circuit and the fourth comparator, in which the second threshold is determined by the ratio of the voltage divider and the second threshold voltage.

* * * * *